W. H. & W. J. CLARK.
WHEEL.
APPLICATION FILED APR. 3, 1915.

1,145,553.

Patented July 6, 1915.

Witnesses:
Geo. Johnson.
M. B. Belden.

William H. Clark
William J. Clark
Inventors by James W. See
Attorney

UNITED STATES PATENT OFFICE.

WILLIAM H. CLARK AND WILLIAM J. CLARK, OF SALEM, OHIO, ASSIGNORS TO THE W. J. CLARK COMPANY, OF SALEM, OHIO.

WHEEL.

1,145,553.     Specification of Letters Patent.     Patented July 6, 1915.

Application filed April 3, 1915. Serial No. 18,876.

*To all whom it may concern:*

Be it known that we, WILLIAM H. CLARK and WILLIAM J. CLARK, citizens of the United States, residing at Salem, Columbia county, Ohio, have invented certain new and useful Improvements in Wheels, of which the following is a specification.

This invention, pertaining to wheels, relates particularly to that type of wheels for use on trucks, etc., formed by uniting two halves of formed-up sheet metal, and the improvements will be readily understood from the following description taken in connection with the accompanying drawing in which:—

Figure 1:
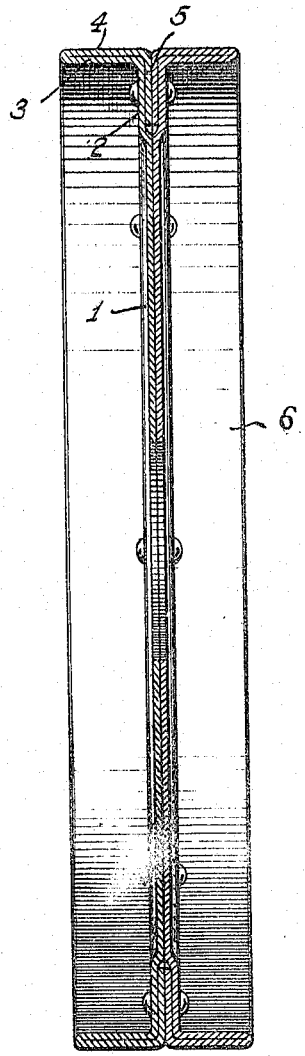
Figure 2:
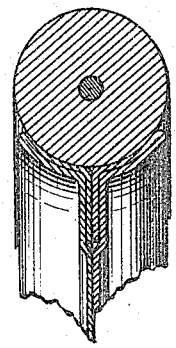
Figure 3:
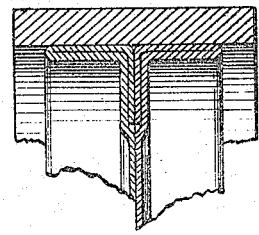
Figure 4:
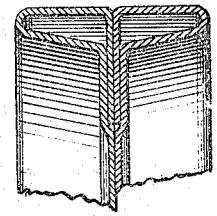

Figure 1 is a diametrical section of a wheel involving our improvements and Figs. 2, 3 and 4 diametrical sections through rims of wheels of modified construction involving our improvements.

In the drawing:—1, indicates a circular web of metal pertaining to one of the side halves of the wheel: 2, an outward annular offset near the periphery of the web: 3, an annular flange turned outwardly from the periphery of the web: 4, an annular portion folded over flange 3 at the outer portion of the wheel: 5, a radially inturned portion of annular portion 4, this radially inturned portion of the metal going into the offset and seating against the inner face of the offset portion 2 of the web, the parts thus far referred to forming one side-half of the wheel: and 6, a second similar side-half.

When the two side-halves are placed together, and secured by any suitable means, there is formed between the annular offset portions of the webs a groove in which fit the radially inturned portions 5, and fastening devices, such as rivets, may pass through the webs and through the radially inturned portions. The construction results in an annulus comprising four thicknesses of metal near the rim of the wheel where the most strains are imposed upon the wheel in use. The wheel may be provided with any usual or suitable form of attached hub.

In the form of the wheel shown in Fig. 1 the inwardly turned portions 4 form the tread of the wheel. Fig. 3 illustrates the wheel as being supplemented by a metal tire to be secured upon its rim by shrinking or by other suitable means. Fig. 2 illustrates the rim of the metallic wheel as being given a concave cross-section suitable for the reception of a rubber tire. Fig. 4 illustrates the wheel of Fig. 1 when the flanges 3 are bent outwardly on convergent lines so as to leave space between them and the inwardly turned portions 4. In all cases the wheel is characterized by the groove formed by the outward sidewise offsetting of the metal of the web near the rim of the wheel and by the radial inward turning of portions from the extreme outer peripheral metal of the wheel.

We claim:—

A wheel comprising, a metallic web outwardly offset near its periphery, an outwardly turned flange at the periphery of the offset, a portion inwardly turned from the outer extremity of the outwardly turned flange, a portion turned radially inward from said inwardly turned portion, a metallic wheel-half being thus formed, and a second similar wheel-half secured to the first wheel-half with their radial inturned portions in contact, combined substantially as set forth.

WILLIAM H. CLARK.
WILLIAM J. CLARK.

Witnesses:
WM. S. GREENE,
D. BAILEY.